United States Patent [19]
Westerman

[11] Patent Number: 6,091,767
[45] Date of Patent: *Jul. 18, 2000

[54] SYSTEM FOR IMPROVING EFFICIENCY OF VIDEO ENCODERS

[76] Inventor: Larry Alan Westerman, 3707 NW. Thurman St., Portland, Oreg. 97210

[*] Notice: This patent issued on a continued prosecution application filed under 37 CFR 1.53(d), and is subject to the twenty year patent term provisions of 35 U.S.C. 154(a)(2).

[21] Appl. No.: 08/794,529

[22] Filed: Feb. 3, 1997

[51] Int. Cl.[7] .............................. H04B 1/66; H04N 7/12

[52] U.S. Cl. .......................................... 375/240; 348/390

[58] Field of Search ................................ 348/13, 15, 20, 348/42, 47, 48, 52, 53, 64, 77, 208, 384, 390, 414; 345/87, 88; 395/502, 575; 340/793; 358/133, 109; 375/240; H04B 1/66; H04N 7/12

[56] References Cited

U.S. PATENT DOCUMENTS

| | | | |
|---|---|---|---|
| 4,267,562 | 5/1981 | Raimodi | 348/109 |
| 4,405,943 | 9/1983 | Kanaly | 358/133 |
| 4,774,574 | 9/1988 | Daly et al. | 358/133 |
| 4,780,761 | 10/1988 | Daly et al. | 358/133 |
| 5,136,377 | 8/1992 | Johnston et al. | 358/136 |
| 5,214,507 | 5/1993 | Aravind et al. | 358/133 |
| 5,237,316 | 8/1993 | Cox, Jr. et al. | 340/793 |
| 5,253,078 | 10/1993 | Balkanski et al. | 358/426 |
| 5,379,409 | 1/1995 | Ishikawa | 395/575 |
| 5,386,233 | 1/1995 | Keith | 348/407 |
| 5,430,480 | 7/1995 | Allen et al. | 348/208 |
| 5,438,357 | 8/1995 | McNeeley . | |
| 5,491,510 | 2/1996 | Gove | 348/77 |
| 5,548,322 | 8/1996 | Zhou . | |
| 5,550,580 | 8/1996 | Zhou . | |
| 5,550,581 | 8/1996 | Zhou . | |
| 5,577,191 | 11/1996 | Bonomi | 395/502 |
| 5,592,227 | 1/1997 | Feng | 348/414 |
| 5,594,495 | 1/1997 | Palmer et al. | 348/17 |
| 5,767,897 | 6/1998 | Howell | 348/16 |
| 5,815,197 | 9/1998 | Kakii | 348/20 |

FOREIGN PATENT DOCUMENTS 0 735 733 A1  10/1996  European Pat. Off. .

OTHER PUBLICATIONS

"The Influence of CRT–Gamma on Luminace and Modulation", by Patrick Vandenberghe, Andre De Clercq, Jan Schaumont, Peter Bracke Barco N.V., Kortrijk, Belgium, SID 90 Digest, 1990, pp. 152–155.

"American National Standard for Telecommunications—Digital Processing of Video Signals—Video Coder/Decoder for Audiovisual Services at 56 to 1536 kbit/s", American National Standards Institute, New York, New York, ANSI TI.314–1991, 31 pages.

(List continued on next page.)

*Primary Examiner*—Chris S. Kelley
*Assistant Examiner*—Tung Vo
*Attorney, Agent, or Firm*—Kevin L. Russell; Chernoff Vilhauer McClung & Stenzel

[57] ABSTRACT

An encoder receives a video input that includes initial video data and encodes the initial video data as encoded video data, such that the encoded video data comprises fewer bytes than the initial video data. The encoded video data is transmitted through a computer network to a decoder that receives the encoded video data and reconstructs an image representative of the video input for viewing on a display. A sensor senses at least one of viewer information representative of at least one of a location and movement of a viewer, and display information identifying the display. Viewer data representative of the at least one of the viewer information and the display information is transmitted to the encoder to modify the method of encoding the initial video data.

17 Claims, 2 Drawing Sheets

OTHER PUBLICATIONS

"Information technology—Coding of moving pictures and associated audio for digital storage media at up to about 1,5 Mbit/s—Part 2: Video", International Standard, ISO/IEC 11172-2, First edition 1993-08-01, Geneve, Switzerland, 125 pages.

"Line Transmission of Non-Telephone Signals", "Video Coding for Low Bitrate Communication", Telecommunication Standardization Section of ITU-T, Draft H.263 (Jul. 5, 1995), 52 pages.

"Information technology—Generic coding of moving pictures and associated audio information: Video", International Standard, ISO/IEC 13818-2 First edition 1996-05-15, Geneve, Switzerland, 211 pages.

"Very Low Bit Rate Video Coding Using H.263 Coder", by King N. Ngan, Douglas Chai, and Andrew Millin, Transactions Briefs, IEEE Transactions on Circuits and Systems for Video Technology, vol. 6, No. 3, Jun. 1996.

"Classified Perceptual Coding with Adaptive Quantization", by Soon Hie Tan, Khee K. Pang, and King N. Ngan, Senior Members, IEEE, IEEE Transactions on Circuits and Systems for Video Technology, vol. 6, No. 4, Aug. 1996, 14 pages.

"Fundamentals of Digital Image Processing", by Anil K. Jain, University of California, Davis, Prentice Hall, Englewood Cliffs, NJ, at least as early as Feb. 3, 1997, 7 pages.

SYSTEM FOR IMPROVING EFFICIENCY OF VIDEO ENCODERS

The present invention relates to a system for modifying an image displayed on a display device.

A digitized image is a two-dimensional array of picture elements or pixels. The quality of the image is a function of its resolution, which is measured as the number of horizontal and vertical pixels per unit length. For example, in a 640 by 480 display, a video frame consists of over 300,000 pixels, each of which may be defined by one of 16.7 million colors (24-bit). Such an exemplary display typically includes approximately a million bytes of data to represent an image in uncompressed form.

Because of the potentially large amounts of data in each image, it is generally preferable to use an encoding methodology suitable for encoding the uncompressed image data into a compressed form containing less bytes. Encoded data images are generally preferable for use in transmission across a computer network to a display or storage device. The computer network may be, for example, the interconnection between a storage device and an attached display device in a desktop computer, or a data line interconnecting distant computers together. In either case, it is desirable to minimize the number of bytes of data being transmitted across a computer network because low bandwidth networks may not be capable of transmitting a sufficient number of bytes of uncompressed image data fast enough to display images at full frame video rates (60 frame per second). Further, for systems capable of transmitting uncompressed image data fast enough to display images at full frame video rates, it is desirable to free up unneeded bandwidth for signals transmitted through high bandwidth networks.

Images exhibit a high level of pixel-to-pixel correlation which permits mathematical techniques, such as a spatial Fourier transform of the image data, to reduce the number of bytes required to represent the image. By using the spatial Fourier transform, the number of bytes of data is primarily reduced by eliminating high frequency information to which the human eye is not very sensitive. In addition, since the human eye is significantly more sensitive to black and white detail than to color detail, some color information in a picture may be eliminated without significantly degrading picture quality.

There are numerous encoding methods, otherwise referred to as standards, currently being used to encode video images that reduce the number of bytes required to be transmitted across computer networks while simultaneously maintaining image quality.

The H.261 standard is suitable for encoding image data of moving images, such as video, for transmission across computer networks. The H.261 standard is formally known as "Digital Processing of Video Signals-Video Coder/Decoder for Audiovisual Services at 56 to 1536 kb.t/s," American National Standards (ANSI) T1.314.1991, and incorporated herein by reference. A similar standard known as the ITU-T Recommendation H.263, also incorporated herein by reference, discloses a similar standard for video coding for low bitrate communication.

Referring to FIG. 1, a H.261 source coder 10 receives digital video 11 in the form of a plurality of nonoverlapping 16×16 pixel blocks at a comparator block 24. Each 16×16 pixel block of digital video is then further divided into four nonoverlapping 8×8 pixel blocks for calculations.

The source coder 10 has two operational modes. The first operational mode, the intraframe mode, primarily involves a discrete cosine transform (DCT) block 12 transforming each 8×8 pixel block of data to a set of spatial frequency coefficients. The output of the transform block 12 normally is an 8×8 block of data primarily consisting of small numbers and a few large numbers. The spatial frequency coefficients from transform block 12 are inputs to a quantizer block 14 that quantizes the spatial frequency coefficients using a single quantization factor (number). In effect, the quantizer block 14 rounds each spatial frequency coefficient to the nearest multiple of the quantization factor and divides the rounded spatial frequency coefficients by the quantization factor to obtain a data set where the original spatial frequency coefficients are replaced by multiples of the quantization factor. The multiple of the quantization factor for each spatial frequency coefficient is transmitted across a computer network to the decoder (not shown).

The output from the DCT block 12 and quantizer block 14 for large spatial frequency coefficients, which tend to be primarily the lower frequency signal components, is the transmission of a small number representative of the number of multiples of the quantization number. The small spatial frequency coefficients, which tend to be primarily the higher frequency signal components, are normally rounded to zero and thus the quantization multiple is zero. The source coder 10 does not transmit zeros to the decoder. In this manner the number of bytes that need to be transmitted across the computer network to represent an image is significantly reduced.

The second operational mode, the interframe mode, uses a memory characteristic for motion compensation of a slightly moved picture. Each 8×8 set of values from the quantizer block 14 is dequantized by both an inverse quantizer block 16 and an inverse DCT block 18 to obtain an 8×8 block of data that is similar to the original input to the source coder 10. The picture memory block 20 maintains the 8×8 pixel block of unencoded data until the next 8×8 pixel block representative of the same location in the image is processed by the source coder 10. A filter block 22 removes some undesirable artifacts, if desired. The comparator block 24 compares the current 8×8 pixel block against the previous 8×8 pixel block stored in the memory block 20 for the same location of the image.

There are three possible outputs from the comparator 24. First, if the current and previous pixel blocks are the same, then no image data needs to be transmitted to the decoder. Second, if the current and previous pixel blocks are similar, then only the differences need to be transmitted to the decoder. Third, if the current and previous pixel blocks are considerably different then intraframe mode is used to compute the current 13×8 pixel block. For color images, the source coder 10 uses luminance and two color difference components (Y, $C_B$ and $C_R$). The H.261 standard requires that the quantization factor be a single constant number.

The control coding block 26 directs the operation of the source coder 10. The outputs of the source coder 10 are as follows:

| | |
|---|---|
| Line 30a | Flag for INTRA/INTER |
| Line 30b | Flag for transmitted or not |
| Line 30c | Quantizer indication |
| Line 30d | Quantizing index for transform coefficients |
| Line 30e | Motion vector |
| Line 30f | Switching on/off of the loop filter |

"Classified Perceptual Coding With Adaptive Quantization", IEEE Transactions On Circuits and Systems for Video Technology, Vol. 6, No. 4, August 1996 is similar to the H.261 standard. This method uses a quantization matrix between the output of the DCT block 12 and the input of the quantizer block 14 to allow selected coefficients, such as high frequency coefficients, to be selectively weighted. For example, selected high frequency coefficients could be adjusted to zero so that they are not transmitted to the decoder.

Motion Picture Experts Group 1 (MPEG-1) is another standard suitable for the transmission of moving images across computer networks. MPEG-1, formally known as "Information Technology - Coding Of Moving Pictures and Associated Audio For Digital Storage Media Up To About 1.5 Mbit/s -", ISO/IEC 11172-2, is herein incorporated by reference. Motion Picture Experts Group 2 (MPEG-2) is yet another standard suitable for the transmission of moving images across computer networks. The MPEG-2, formally known as "Information Technology-Generic Coding Of Moving Pictures and Associated Audio Information: Video", ISO/IEC 13818-2, is also incorporated herein by reference. The MPEG-1 and MPEG-2 standards include a matrix of quantizer values that allow the selection of the quantization factor for each value within a pixel block of data to accommodate the variation in sensitivity of the human visual system to different spatial frequencies. Using the quantization matrix permits finer control over the quantization of the spatial frequency coefficients than the single quantization factor used in the H.261 and H.263 standards.

Johnston et al., U.S. Pat. No. 5,136,377, incorporated by reference herein, teach an image compression system, particularly suitable for high definition television, that is optimized to minimize the transmission bitrate while maintaining high visual quality for television. The techniques used involve variable pixel sized blocks, variable quantization error, determination of the frequency of peak visibility, thresholds for textured inputs, directionality, and temporal masking.

More specifically, Johnston et al. describe a DCT-based video image compression system that uses variable sized pixel blocks. Johnson et al. teach that the human visual system has a greater response to lower frequency components than to higher frequency components of an image. In fact, the relative visibility as a function of frequency starts at a reasonably good level at low frequencies, increases with frequency up to a peak at some frequency, and thereafter drops with increasing frequency to below the relative visibility at low frequencies. Accordingly, more quantization error can be inserted at high frequencies than at low frequencies while still maintaining a good image. In addition, Johnston et al. teach that the absolute frequency at which the peak visibility occurs depends on the size of the screen and the viewing distance.

Johnston et al. also describe the use of thresholds for textured inputs. Texture is defined as the amount of AC energy at a given location, weighted by the visibility of that energy. The human visual system is very sensitive to distortion along the edges of an object in an image, but is much less sensitive to distortion across edges. Johnston et al. accounts for this phenomena by introducing the concept of directionality as a component.

Further, Johnston et al. account for a phenomena known as temporal masking. When there is a large change in the content of an image between two frames at a fixed location in the scene, the human visual system is less sensitive to high frequency details at that location in the latter frame. By detecting the occurrence of large temporal differences, the perceptual thresholds at these locations can be increased for the current frame. This results in decreasing the number of bytes that need to be transmitted for a portion of the image.

Daly et al., U.S. Pat. No. 4,774,574, incorporated by reference herein, disclose a system for transmitting a digital image where the spatial frequency coefficients are quantized in accordance with a model of the visibility to the human eye of the quantization error in the presence of image detail. The human visual system is less sensitive to different spatial frequencies in the presence of a nonuniform image than in the presence of a uniform image, referred to as visual masking. Accordingly, Daly et al. teach a method of reducing the bitrate for transmission in those regions of the image to which the human eye is not especially sensitive.

Daly et al., U.S. Pat. No. 4,780,761, incorporated by reference herein, disclose an image compression system by incorporating in its model of the human visual system the fact that the human visual system is less sensitive to diagonally oriented spatial frequencies than to horizontally or vertically oriented spatial frequencies.

Aravind et al., U.S. Pat. No. 5,213,507, incorporated herein by reference, disclose a video signal compression system suitable for MPEG environments. The system develops the quantization parameter for use in encoding a region of an image based on (a) a categorization of the region into one of a predetermined plurality of perceptual noise sensitivity (PNS) classes, (b) a level of psycho-visual quality that can be achieved for the encoded version of the image, and (c) a prestored empirically derived model of the relationship between the PNS classes, the psycho-visual quality levels, and the values of the quantization parameter. PNS indicates the amount of noise that would be tolerable to a viewer of the region. Some characteristics on which PNS class may be based are: spatial activity, speed of motion, brightness of the region, importance of the region in a particular context, presence of edges within the region, and texture of the region, e.g., from "flat" to "highly textured." The PNS classes may also include the combination of the characteristics of a region of the image. Aravind et al. also attempt to design a system that minimizes the bitrate based on the content of the image.

All of the aforementioned systems are designed to reduce the bitrate for transmission of moving images over a computer network based on the content of the image and a model of the human visual system. However, all aforementioned systems fail to consider the resultant image quality based on factors outside of the image content and the presumed location of the viewer. What is desired, therefore, is a video encoding system that incorporates the activity of the viewer and particulars of the display device in determining the necessary image quality to be transmitted across the computer network.

BRIEF SUMMARY OF THE INVENTION

The present invention overcomes the aforementioned drawbacks of the prior art by providing a method of encoding video for transmission through a computer network. An encoder receives a video input that includes initial video data and encodes the initial video data as encoded video data, such that the encoded video data comprises fewer bytes than the initial video data. The encoded video data is transmitted through the computer network to a decoder that receives the encoded video data and reconstructs an image representative of the video input for viewing on a display. A sensor senses at least one of viewer information representative of at least one of a location and movement of a viewer, and display information identifying the display. Viewer data representative of the at least one of the viewer information and the display information is transmitted to the encoder to modify the method of encoding the initial video data.

In the preferred embodiment, the viewer information includes data representative of at least one of, how far a viewer is from the display, the angle of the viewer in relation to the display, the portion of the display that the viewer is viewing, movement of the viewer in relation the display, and changes in the portion of the display that the viewer is viewing. The display information includes data representative of at least one of the type of the display and the size of the display. By changing the focus from encoding the video solely based on the content of the video itself to include viewer information and display information, the bandwidth required for transmitting the encoded video data can be further reduced.

DETAILED DESCRIPTION OF THE INVENTION

All of the known systems for encoding video images for transmission across a computer network are predicated on the theory that there exists an optimal encoding and decoding technique based on both the content of the image itself and bandwidth limitations of the computer network. In other words, the designs of known systems have been primarily focused on developing encoding and decoding techniques suitable for a particular display with a viewer at a predetermined distance from the display. However, such systems totally ignore any potential activity of the viewer, such as movement, and the operational characteristics of different displays that may be connected to the decoder. For example, a particular system may be designed for use with a 17-inch cathode ray tube (CRT) display having a viewer located an average of 2 feet from the display in a perpendicular direction to the plane of the display. The same system does not provide good results when used with a liquid crystal display (LCD) device, principally because CRT and LCD displays have different performance characteristics. For example, liquid crystal displays have relatively slow refresh rates and lack the capability to display fine detail in comparison to CRT displays.

Figure 1:
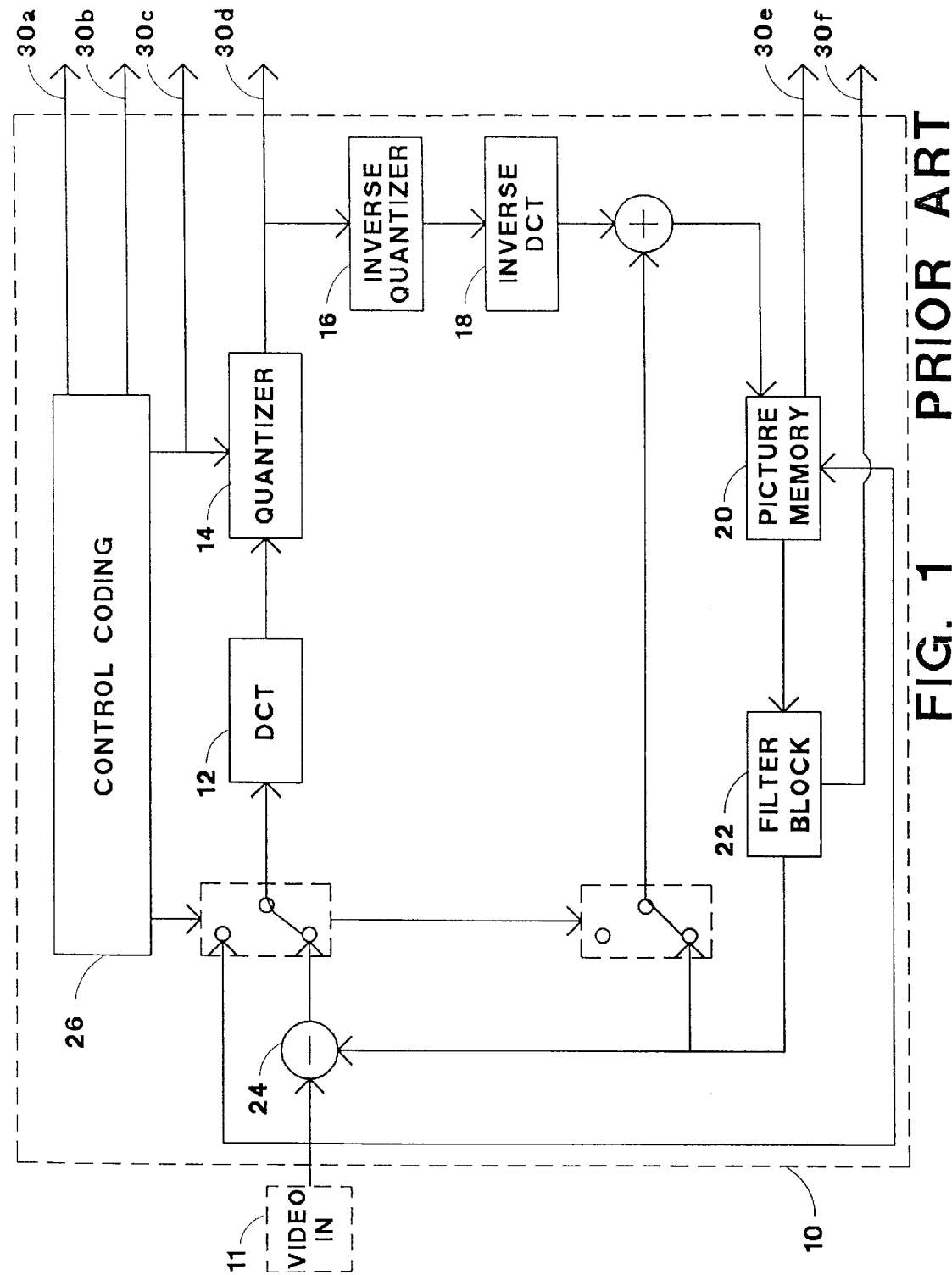
FIG. 1 is a block diagram of an exemplary embodiment of a H.261 source coder.
Figure 2:
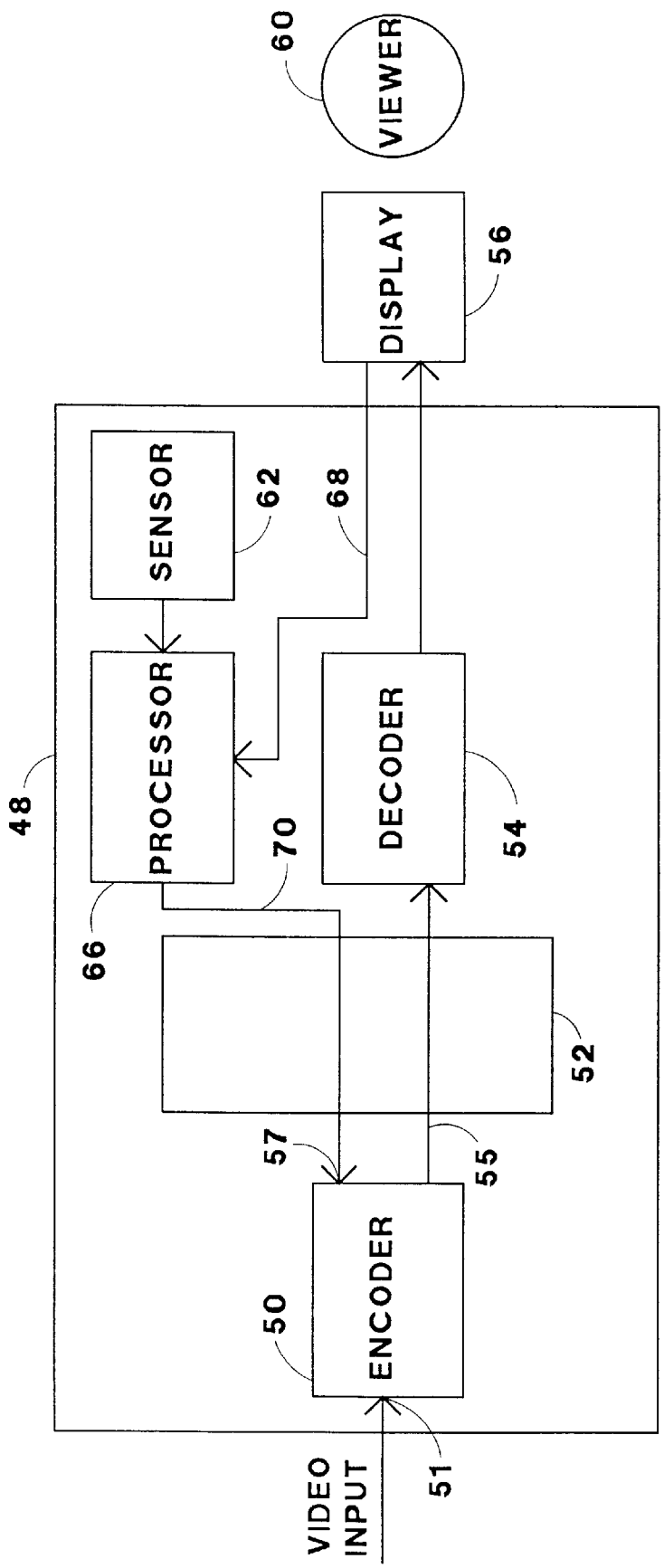
FIG. 2 is a block diagram of an exemplary embodiment of a video encoding and decoding system of the present invention.

Referring to FIG. 2, a video encoding and decoding system 48 includes an encoder 50 with a video input 51 for video images. The encoder 50 may be any type of device that encodes video images into an encoded digital format, such as, for example, MPEG-1, MPEG-2, H.261, and H.263. Typically, the encoder spatially transforms each (or selected) frame of the video into spatial frequency components and quantizes the result to reduce the amount of data required to represent each frame of the video. The data which results from the video compression technique may be referred to as encoded video data. The encoded video data from the encoder 50 is transmitted through a forward channel 55 of a computer. network 52 to a decoder 54. The computer network 52 may be simply the interconnection between different components within a desktop computer or the interconnection between an encoder 50 remotely located from a decoder 54. Also, the computer network 52 may be a wireless transmission system with transmitters and receivers. The decoder 54 receives the encoded video data and reconstructs each video frame for viewing on a display 56.

The particular method used to reconstruct the image differs depending on the particular encoder 50. In addition, the encoder 50 and decoder 54 normally change encoding parameters on a periodic basis, such as a frame-to-frame or a block-to-block basis. Further, the encoder 50 includes an external input 57 where the encoding parameters of the encoder 50 can be set if desired. Typical systems normally also transmit control data with the encoded video data to instruct the decoder 54 how to decode each frame or block of the encoded video data.

The present invention incorporates both the activity of a viewer 60 and the particular characteristics of the type of display 56 used in the system 48, so that the encoding and decoding of the video frames may be performed to optimize the image for viewing. The activity of the viewer 60 may be divided into two viewer information categories: viewing characteristics information, such as how far the viewer 60 is from the display 56 and the viewing angle of the viewer 60, and viewer observation information, such as the portion of the display 56 that the viewer 60 is viewing. Information regarding the type and size of the display 56 is referred to herein as display information.

The system of the present invention, as shown in FIG. 2, includes a sensor 62 that may be located proximate to the viewer 60 to detect the position of the viewer 60 relative to the display 56 using a simple light reflection circuit (not shown). The sensor 62 transmits its data to a processor 66 that processes the information from the sensor 62 into viewer information.

The use of an external sensor 62 and processor 66 to detect and calculate viewer information permits existing video display systems to be retrofitted with the sensor 62 and processor 66 to obtain viewer information without redesigning the encoder 50 and decoder 54. Alternatively, either or both the sensor 62 and the processor 66 may be included within the display 56 or other components of the system 48. In the case of a teleconferencing system, the processor 60 may calculate the viewer information from the image of the viewer 60 obtained for teleconferencing purposes.

The processor 66 may also receive display information. Generally, the display information is transmitted via a connection 68 interconnecting the display 56 to the processor 66. Alternatively, the connection 68 may be from the decoder 54 or sensor 62 to the processor 66. Another alternative is that the sensor 62 and processor 66 could capture and analyze, respectively, an image of the display 56 to determine the type and size of the display 56. A further alternative is to include a set of manually selected switches at the display 56, sensor 62, or processor 66 that the viewer sets to indicate the type and size of the display 56. The processor 66 uses the display information to instruct the encoder 50 on how to optimally encode the video images suitable for the particular display 56.

The viewer information and the display information are periodically processed by the processor 66 to calculate the appropriate parameters that should be used to encode the video input. As previously described, many systems permit changing the encoding parameters on a frame-by-frame or block-by-block basis. To provide the encoder 50 with the appropriate encoding parameters the processor 66 transmits the encoding parameters through a back channel 70 to the encoder 50. The encoding parameters are typically a matrix of values used to quantize the result of the discrete cosine transform within the encoder 50. The back channel 70, in systems such as MPEG-1 and MPEG-2, may be the extra unused bits in the bit stream that are transmitted from the decoder 54 to the encoder 50.

Turning first to the display information, it should be noted that there are countless different types and sizes of displays that may be used. A few examples of different display types include, CRT, plasma, LCD (passive and active), and thin-film electroluminescent (passive and active). Each display has different operational characteristics, otherwise known as a modulation transfer function, that influence the optimum method for encoding the video frames for viewing. The modulation transfer function is the frequency response of the display in both spatial (how fine of detail the display can generate) and temporal (time required for the display to generate an image) characteristics. Several examples include: a LCD has a slow temporal response in comparison to a CRT; a plasma display has a higher spatial frequency response than a CRT; and a consumer grade television has a lower spatial response than a CRT display. As a result, for plasma displays it may be advantageous to transmit more high frequency components as the display is capable of displaying such information. In contrast, there is no reason to transmit high frequency components if the destination display is a consumer grade television because it is not capable of displaying such high frequency components. For slow temporal response displays, such as LCDs, it may be advantageous to transmit only a fraction of the available video frames.

Viewer information is generally obtained by a sensor 62 that captures an image of the viewer 60. Based on the size of the image, a determination may be made about viewing characteristics information, such as the distance between the viewer 60 and the display 56, and about viewer observation information, such as the portion of the display 56 on which the viewer's eyes are focused.

As mentioned above, viewing characteristics information relates to information such as how far the viewer 60 is from the display 56 and the viewing angle of the viewer 60. If the viewer 60 is far away from the display 56 then the viewer 60 will not be capable of seeing fine details, so high frequency signals should not be transmitted to the decoder 54. The distance calculation may also incorporate the size of the display device 56. In contrast, if the viewer 60 is close to the display 56 then the viewer 60 will be capable of seeing fine details, so the high frequency signals should be transmitted to the decoder 54. The viewing angle is used in combination with the display information because some displays, such as LCD displays, have a poor angular response. Accordingly, with a display 56 that has a poor angular response the viewer 60 will not see fine details if he is not generally perpendicular to the display 56 so the high frequency components do not need to be transmitted to the decoder 54. In addition, the spatial frequency, intensity, and contrast degrade when viewing a LCD display at an angle that is significantly off perpendicular.

Viewer observation information, as mentioned above, refers to portion of the display 56 that the viewer 60 is observing and changes in the portion of the display 56 that the viewer 60 is viewing by movement of the viewer's eyes or movement of the viewer 60. The portion of the display 56 that the viewer 60 is observing is determined by the processor 66. Over time the processor 66 also tracks changes in the portion of the display 56 that the viewer 60 is observing. Viewer observation information can also be used to selectively increase the image detail in those portions of the display 56 that are actually being viewed and decreasing the image detail in the remainder of the display 56. The human visual system is not sensitive to fine image details ashen changing the portion of the image being viewed. If the processor 66 detects viewer movement then the image detail can be reduced without a noticeable decrease in image quality for the viewer 60.

It should be noted that additional techniques, such as those detailed in the background of the invention, can be employed in combination with the viewer information and display information to modify the method of encoding and decoding the video images. "Classified Perceptual Coding with Adaptive Quantization," referred to in the background is incorrect in its derivation of the matrix. In the preferred embodiment of the relative quantization level or threshold levels for the DCT coefficients of a reconstructed MPEG-1, MPEG-2, H.261, and H.263 video image w pels wide and h lines high (assuming the displayed pixels are square), viewed at a distance of N times the physical display height, the following relationships actually apply.

For an 8×8 DCT block, the cycles per block for horizontal or vertical basis function i is given by:

$$C^i_b = (i-1)/2 \tag{1}$$

while the cycles per pel is given by:

$$C^i_p = (i-1)/16 \tag{2}$$

and the cycles per degree of visual is given by:

$$C^d_i = (i-1)\frac{hN\pi}{180*16} \tag{3}$$

For a display of width W mm with w pels, the cycles per mm is given by:

$$C^m_i = \frac{(i-1)w}{16W} \tag{2}$$

For DCT coefficient i,j(1<i,j<8), the radial spatial frequency is given by:

$$r_{i,j} = \frac{hN\pi}{180*16}\sqrt{(i-1)^2 + (j-1)^2} \tag{4}$$

The one-dimensional spatial frequency response of the human visual system (HVS) is related by the equation:

$$H(r) = (0.2 + 0.45r)e^{-0.18r} \tag{5}$$

where H is the (relative) sensitivity of the HVS at radial frequency r expressed in cycles per degree of visual angle subtended. This relationship was derived for large area displays, and must be modified for the 8×8 blocks utilized in DCT encoding so that the relative sensitivity does not fall off below the radial frequency of maximum sensitivity (r≈5.1):

$$H(r) = \begin{cases} 1.0 & r \leq 5.1 \\ (0.2 + 0.45r)e^{-0.18r} & r \leq 5.1 \end{cases} \tag{6}$$

The quantization matrix can be computed by the relationship $$Q(i,j) = \frac{Q_0}{H(r_{i,j})} \tag{7}$$

where $Q_0$ is the minimum desired quantization value. The corresponding threshold matrix value would be one-half the quantization value. In practice, the quantization and threshold values are converted to integer values prior to use.

For an image height of 480 pels, viewed at a distance of four times the image height, combining equations (4), (6), and (7) yields the following quantization matrix:

$$Q(i, j) = \begin{bmatrix} 16 & 16 & 16 & 16 & 18 & 21 & 26 & 33 \\ 16 & 16 & 16 & 17 & 18 & 22 & 27 & 33 \\ 16 & 16 & 16 & 17 & 19 & 23 & 28 & 35 \\ 16 & 17 & 17 & 19 & 21 & 25 & 31 & 38 \\ 18 & 18 & 19 & 21 & 24 & 29 & 35 & 43 \\ 21 & 22 & 23 & 25 & 29 & 33 & 40 & 49 \\ 26 & 27 & 28 & 31 & 35 & 40 & 48 & 58 \\ 33 & 33 & 35 & 38 & 43 & 49 & 58 & 70 \end{bmatrix} \quad (8)$$

which would be used for MPEG-1 or MPEG-2 encoders, or the following threshold matrix:

$$T(i, j) = \begin{bmatrix} 8 & 8 & 8 & 8 & 9 & 11 & 13 & 16 \\ 8 & 8 & 8 & 8 & 9 & 11 & 13 & 17 \\ 8 & 8 & 8 & 9 & 10 & 12 & 14 & 18 \\ 8 & 8 & 9 & 9 & 11 & 13 & 15 & 19 \\ 9 & 9 & 10 & 11 & 12 & 14 & 17 & 21 \\ 11 & 11 & 12 & 13 & 14 & 17 & 20 & 25 \\ 13 & 13 & 14 & 15 & 17 & 20 & 24 & 29 \\ 16 & 17 & 18 & 19 & 21 & 25 & 29 & 35 \end{bmatrix} \quad (9)$$

which would be used for H.261 or H.263 encoders.

For an image height of 1024 pels, viewed at a distance of twice the image height, the corresponding MPEG-1 quantization matrix is:

$$Q(i, j) = \begin{bmatrix} 16 & 16 & 16 & 17 & 19 & 23 & 29 & 37 \\ 16 & 16 & 16 & 17 & 19 & 23 & 29 & 37 \\ 16 & 16 & 16 & 18 & 20 & 25 & 31 & 40 \\ 17 & 17 & 18 & 20 & 23 & 27 & 34 & 43 \\ 19 & 19 & 20 & 23 & 26 & 32 & 39 & 49 \\ 23 & 23 & 25 & 27 & 32 & 37 & 46 & 57 \\ 29 & 29 & 31 & 34 & 39 & 46 & 55 & 69 \\ 37 & 37 & 40 & 43 & 49 & 57 & 69 & 84 \end{bmatrix} \quad (10)$$

with threshold matrix:

$$T(i, j) = \begin{bmatrix} 8 & 8 & 8 & 8 & 9 & 11 & 14 & 18 \\ 8 & 8 & 8 & 8 & 10 & 12 & 15 & 19 \\ 8 & 8 & 8 & 9 & 10 & 12 & 15 & 20 \\ 8 & 8 & 9 & 10 & 11 & 14 & 17 & 22 \\ 9 & 10 & 10 & 11 & 13 & 16 & 19 & 25 \\ 11 & 12 & 12 & 14 & 16 & 19 & 23 & 29 \\ 14 & 15 & 15 & 17 & 19 & 23 & 28 & 34 \\ 18 & 19 & 20 & 22 & 25 & 29 & 34 & 42 \end{bmatrix} \quad (11)$$

Increasing the viewing distance to three times the image height yields the quantization matrix:

$$Q(i, j) = \begin{bmatrix} 16 & 16 & 17 & 21 & 29 & 42 & 64 & 101 \\ 16 & 16 & 17 & 22 & 30 & 44 & 67 & 104 \\ 17 & 17 & 20 & 25 & 34 & 49 & 74 & 115 \\ 21 & 22 & 25 & 31 & 42 & 60 & 88 & 135 \\ 29 & 30 & 34 & 42 & 55 & 77 & 111 & 167 \\ 42 & 44 & 49 & 60 & 77 & 104 & 148 & 217 \\ 64 & 67 & 74 & 88 & 111 & 148 & 205 & 294 \\ 101 & 104 & 115 & 135 & 167 & 217 & 294 & 413 \end{bmatrix} \quad (12)$$

with threshold matrix:

$$T(i, j) = \begin{bmatrix} 8 & 8 & 8 & 10 & 14 & 21 & 32 & 51 \\ 8 & 8 & 9 & 11 & 15 & 22 & 33 & 52 \\ 8 & 9 & 10 & 12 & 17 & 25 & 37 & 58 \\ 10 & 11 & 12 & 16 & 21 & 30 & 44 & 67 \\ 14 & 15 & 17 & 21 & 28 & 38 & 56 & 83 \\ 21 & 22 & 25 & 30 & 38 & 52 & 74 & 108 \\ 32 & 33 & 37 & 44 & 56 & 74 & 102 & 147 \\ 51 & 52 & 58 & 67 & 83 & 108 & 147 & 207 \end{bmatrix} \quad (13)$$

The preceeding matrices are appropriate for pixel-addressed liquid crystal displays. However, for cathode ray tube displays, the modulation transfer function of the display must be taken into account. For this case, the equation for the quantization matrix takes the form:

$$Q(i, j) = \frac{Q_0}{H(r_{i,j}) M(C^m_{i,j})} \quad (14)$$

where $M(C^m_{ij})$ is the modulation transfer function of the CRT, which is:

$$M(v) = e^{-3.56 s^2 v^2} \quad (15)$$

where s is the spot size of the CRT beam in mm, and v is the spatial frequency in cycles/mm.

For a CRT of height 250 mm with 480 pels (lines), using an 0.28 mm spot diameter, viewed at a distance of 4 times the image height, combining equations (14) and (15) yields the following quantization matrix:

$$Q(i, j) = \begin{bmatrix} 16 & 16 & 16 & 17 & 19 & 24 & 30 & 40 \\ 16 & 16 & 16 & 17 & 20 & 24 & 31 & 41 \\ 16 & 16 & 17 & 18 & 21 & 26 & 33 & 43 \\ 17 & 17 & 18 & 20 & 24 & 29 & 37 & 48 \\ 19 & 20 & 21 & 24 & 28 & 34 & 43 & 55 \\ 24 & 24 & 26 & 29 & 34 & 41 & 51 & 66 \\ 30 & 31 & 33 & 37 & 43 & 51 & 64 & 82 \\ 40 & 41 & 43 & 48 & 55 & 66 & 82 & 104 \end{bmatrix} \quad (16)$$

which would be used for MPEG-1 or MPEG-2 encoders, or the following threshold matrix:

$$T(i, j) = \begin{bmatrix} 8 & 8 & 8 & 8 & 10 & 12 & 15 & 20 \\ 8 & 8 & 8 & 9 & 10 & 12 & 15 & 20 \\ 8 & 8 & 8 & 9 & 11 & 13 & 16 & 22 \\ 8 & 9 & 9 & 10 & 12 & 14 & 18 & 24 \\ 10 & 10 & 11 & 12 & 14 & 17 & 21 & 28 \\ 12 & 12 & 13 & 14 & 17 & 20 & 26 & 33 \\ 15 & 15 & 16 & 18 & 21 & 26 & 32 & 41 \\ 20 & 20 & 22 & 24 & 28 & 33 & 41 & 52 \end{bmatrix} \quad (17)$$

which would be used for H.261 or H.263 encoders.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of encoding video for transmission through a computer network comprising the steps of:
    (a) receiving at an encoder a video input, comprising a plurality of frames of a video containing initial video data and encoding said initial video data as encoded video data, such that said encoded video data is comprised of fewer bytes than said initial video data;
    (b) transmitting said encoded video data through said computer network to a decoder that receives said encoded video data and reconstructs a plurality of images representative of said video input for viewing on a display;
    (c) sensing with a sensor display information identifying physical presentation characteristics of said display and viewer information representative of at least one of a location and movement of a viewer; and
    (d) transmitting viewer data representative of said viewer information and said display information to said encoder so as to modify the method of said encoding of said initial video data wherein said method of encoding is modified in response to both said viewer information and said display information.

2. The method of claim 1 wherein said encoding further includes the steps of:
    (a) transforming said initial video data into spatial frequency components; and
    (b) quantizing said spatial frequency coefficients.

3. The method of claim 2 wherein said transforming said initial video data is a spatial Fourier transform.

4. The method of claim 1 wherein said encoding includes encoding parameters.

5. The method of claim 4 wherein said modifying of said encoding of said initial video data includes changing said encoding parameters.

6. The method of claim 1 wherein the step of said transmitting of said encoded video data through said computer network to said decoder is through a forward channel, and said transmitting of said at least one of said viewer information and said display information to said encoder is through a back channel.

7. The method of claim 6 wherein said forward channel and said back channel are the same channel.

8. The method of claim 1 wherein said encoder and said decoder are remotely located from one another.

9. The method of claim 1 wherein said encoder and said decoder are proximate one another.

10. The method of claim 1 wherein said computer network is a wireless transmission and reception system.

11. The method of claim 1 wherein said computer network is the interconnection between different components within a desktop computer.

12. The method of claim 1 wherein said sensor is located proximate a viewer who is proximate said display.

13. The method of claim 1 wherein said transmitting said at least one of said viewer information and said display information further comprises the steps of:
    (a) transmitting said at least one of viewer information and display information to a processor which calculates encoding parameters for said encoder; and
    (b) transmitting said encoding parameters to said encoder.

14. The method of claim 1 wherein said viewer information includes data representative of at least one of, how far a viewer is from said display, the angle of said viewer in relation to said display, the portion of said display that said viewer is viewing, movement of said viewer in relation to said display, and changes in the portion of said display that said viewer is viewing.

15. The method of claim 1 wherein said display information includes data representative of at least one of the type of said display and size of said display.

16. The method of claim 1 wherein said sensing said display information is from a set of switches.

17. The method of claim 1 wherein said sensing said display information is based on analysis of an image displayed on said display.

* * * * *

UNITED STATES PATENT AND TRADEMARK OFFICE
CERTIFICATE OF CORRECTION

PATENT NO. : 6,091,767
DATED : July 18, 2000
INVENTOR(S) : Larry Allen Westerman It is certified that error appears in the above-identified patent and that said Letters Patent is hereby corrected as shown below:

Column 1,
Line 54, change "kb.t/s" to -- kbit/s --

Column 7,
Lien 65, change "ashen" to -- when --

Column 8,
Line 19, change "$C_b^i = (i-1)/2$" to -- $C_i^b = \dfrac{(i-1)}{2}$ --

Line 23, change "$C_p^i = (i-1)/16$" to -- $C_p^i = \dfrac{(i-1)}{16}$ --

Signed and Sealed this

Twenty-first Day of May, 2002

Attest:

Attesting Officer

JAMES E. ROGAN
Director of the United States Patent and Trademark Office